(12) United States Patent
Bruex

(10) Patent No.: US 9,869,310 B2
(45) Date of Patent: Jan. 16, 2018

(54) METHOD AND DEVICE FOR ACTIVATING AN ELECTRIC VACUUM PUMP FOR A BRAKE BOOSTER OF A VEHICLE

(71) Applicant: Thomas Bruex, Sachsenheim (DE)

(72) Inventor: Thomas Bruex, Sachsenheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 644 days.

(21) Appl. No.: 14/358,510

(22) PCT Filed: Sep. 18, 2012

(86) PCT No.: PCT/EP2012/068351
§ 371 (c)(1),
(2) Date: May 15, 2014

(87) PCT Pub. No.: WO2013/072103
PCT Pub. Date: May 23, 2013

(65) Prior Publication Data
US 2015/0037173 A1 Feb. 5, 2015

(30) Foreign Application Priority Data

Nov. 15, 2011 (DE) .......................... 10 2011 086 340

(51) Int. Cl.
*F04B 49/02* (2006.01)
*B60T 17/02* (2006.01)
(Continued)

(52) U.S. Cl.
CPC ............ *F04B 49/065* (2013.01); *B60T 13/52* (2013.01); *B60T 13/662* (2013.01); *B60T 17/02* (2013.01); *F04B 49/02* (2013.01)

(58) Field of Classification Search
CPC ........ B60T 13/52; B60T 13/662; B60T 17/02; B60T 8/425; F04B 49/065; F04B 49/02; F04B 49/022
(Continued)

(56) References Cited

U.S. PATENT DOCUMENTS 6,499,813 B1 * 12/2002 Wandel ................. B60T 8/4036
303/11
7,475,951 B2 * 1/2009 Ichikawa ............... B60K 6/543
188/356
(Continued)

FOREIGN PATENT DOCUMENTS

CN    101284530 A    10/2008
CN    101767581 A    7/2010
(Continued)

OTHER PUBLICATIONS

International Search Report for PCT/EP2012/068351, dated Feb. 1, 2013.

*Primary Examiner* — Philip Stimpert
(74) *Attorney, Agent, or Firm* — Norton Rose Fulbright US LLP; Gerard Messina

(57) ABSTRACT

Described are a method and a device for activating an electric vacuum pump for a brake booster of a vehicle. The brake booster is supplied with a vacuum from a vacuum reservoir. The vacuum pump is designed to increase the vacuum in the vacuum reservoir as soon as the vacuum drops below a predefinable switch-on threshold. In order to avoid unnecessarily frequent switching on of the vacuum pump, which may irritate the driver, an expected decrease of the vacuum in the vacuum reservoir as a result of an instantaneous braking operation is estimated and the switch-on threshold of the vacuum pump is temporarily reduced if the vacuum instantaneously prevailing in the vacuum reservoir minus the estimated vacuum decrease is greater than (Continued)

a predetermined adjustment point vacuum, below which the brake booster can no longer act in a sufficiently boosting manner.

10 Claims, 2 Drawing Sheets

(51) Int. Cl.
*F04B 49/06* (2006.01)
*B60T 13/52* (2006.01)
*B60T 13/66* (2006.01)

(58) Field of Classification Search
USPC .......... 137/565.23; 303/12, 29, 114.3, 115.3, 303/115.4
See application file for complete search history.

(56) References Cited

U.S. PATENT DOCUMENTS

2004/0162652 A1\* 8/2004 Kems ................ B60T 13/52
701/30.7
2005/0218716 A1\* 10/2005 Collins ............... B60T 13/72
303/115.3

FOREIGN PATENT DOCUMENTS

| | | |
|---|---|---|
| CN | 201721440 U | 1/2011 |
| DE | 102009046006 | 4/2011 |
| JP | 05338528 A \* | 12/1993 |

\* cited by examiner

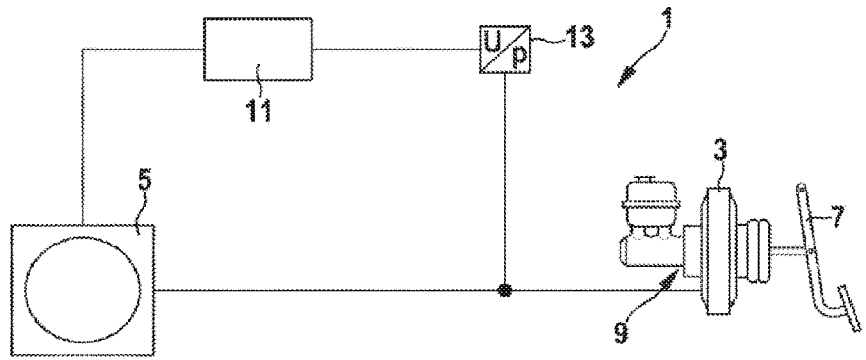
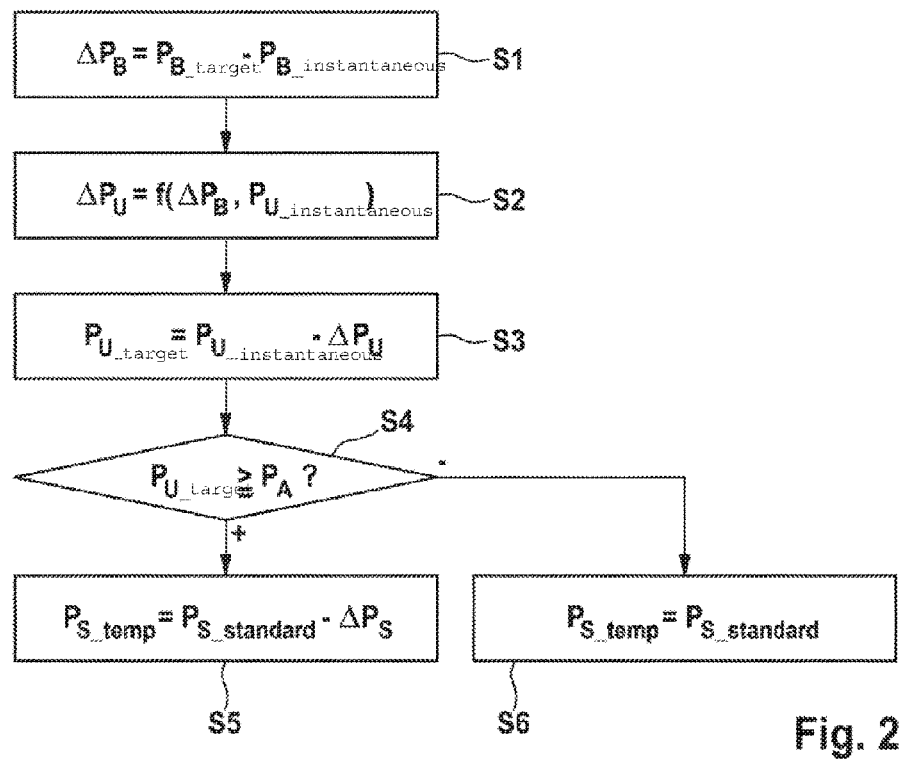
Fig. 2

METHOD AND DEVICE FOR ACTIVATING AN ELECTRIC VACUUM PUMP FOR A BRAKE BOOSTER OF A VEHICLE

FIELD OF THE INVENTION

The present invention relates to a method and to a device for activating an electric vacuum pump for a brake booster of a vehicle. The application further relates to a computer program product having machine-readable code and a computer-readable medium on which a computer program product is stored, the machine readable-code activating a machine in order to carry out the method according to the present invention.

BACKGROUND INFORMATION

In modern motor vehicles, the driver is typically assisted by a brake booster during braking. The brake booster makes it possible to reduce an actuating force on the brake of the motor vehicle which is required to achieve the desired braking effect. In passenger vehicles and light commercial vehicles in particular, vacuum brake boosters are generally employed which draw their energy from a vacuum, i.e., from a pressure difference between an atmospheric pressure and a gas pressure prevailing in a vacuum reservoir.

It is noted that within the scope of this description, vacuum is understood to mean the degree of difference between the atmospheric pressure, assumed herein to be 1013 hPa, and the pressure prevailing in the vacuum reservoir, which during operation is typically less or equal to 1013 hPa, i.e., the vacuum is assumed to have a positive sign.

The vacuum prevailing in the vacuum reservoir may be generated in a number of ways. Conventionally, the vacuum is usually tapped at a throttle valve in the intake manifold of an internal combustion engine. The strength of the vacuum so generated depends on the operating state of the internal combustion engine. Alternatively, a mechanical vacuum pump or an electric vacuum pump may generate the required vacuum. The use of an electric vacuum pump in this case has the advantage that the vacuum may be generated regardless of the state of the internal combustion engine. This may be significant, particularly in the case of vehicles which have a so-called start-stop function or in the case of hybrid vehicles. In electric vehicles, the use of an electric vacuum pump is presently the only practical option for generating the vacuum for the brake booster.

However, the characteristics and the timing of the generation of a vacuum in the case of an electric vacuum pump differ from those of mechanical vacuum pumps or of an intake manifold vacuum. A mechanical vacuum pump continuously generates a vacuum and an intake manifold vacuum is built up mainly by applying or releasing a gas pedal of the motor vehicle, whereas an electric vacuum pump is typically activated with the aid of a regulator.

For example, German Published Patent Appln. No.10 2009 046 006 describes inter alia a method for monitoring the function of an electric vacuum pump in a braking system. In this method, the vacuum pump is activated during operation between a switch-on pressure representing a first pressure threshold and a switch-off pressure representing a second pressure threshold. Thus, the electric vacuum pump does not start generating a vacuum for the brake booster until the vacuum prevailing in the vacuum reservoir has reached a defined switch-on threshold. This occurs mainly when applying or releasing the brake.

It was observed that using electric vacuum pumps for the brake boosting system regulated in this manner may have a negative impact on driving comfort and may irritate the driver when applying the brake.

SUMMARY

The described method and the described device for activating an electric vacuum pump for a brake booster of a motor vehicle allow for increased driving comfort and reduce or prevent irritations on the part of the driver when applying a vehicle brake.

Concepts for specific embodiments of the present invention are based on the following findings: In the case of a vehicle brake in which a braking force initiated by the driver is assisted by a brake booster, the supplying vacuum of which is generated with the aid of an electric vacuum pump, switching on the electric vacuum pump may result in a clearly perceptible change in the feel of the brake pedal. The vacuum build-up in the vacuum reservoir of the brake booster leads to an increase in the force caused by the brake booster. As a result, the brake pedal may suddenly feel soft upon activation or, with constant foot pressure, the brake pedal moves further in the direction of a splashboard of the motor vehicle. Both effects may irritate a driver during a braking operation.

Therefore, measures are described for preventing a sudden change or at least reducing the frequency in occurrence of such changes in the assist effect of the brake booster during the braking operation, triggered by the switching on of the electric vacuum pump. At the same time the legally required deceleration of the motor vehicle to be achieved with the braking system is ensured.

For this purpose, it is provided that an expected reduction of the vacuum in the vacuum reservoir of the brake booster as it occurs during an instantaneous braking operation is estimated, and the switch-on threshold below which the electric vacuum pump is switched on, is temporarily reduced in the event the vacuum instantaneously prevailing in the vacuum reservoir minus the estimated expected reduction of the vacuum during the braking operation is greater than a predetermined adjustment point vacuum of the braking system.

In other words, a method for activating an electric vacuum pump for a brake booster is described in which it is estimated whether braking to a required deceleration is possible without reaching the adjustment point of the braking system in the process. If the vacuum instantaneously prevailing in the vacuum reservoir is sufficient to execute braking without reaching the adjustment point, the switch-on threshold for switching on the electric vacuum pump is temporarily shifted to a reduced value. In this way the vacuum prevailing in the vacuum reservoir does not drop below the switch-on threshold so reduced during the course of the braking operation and, therefore, the electric vacuum pump is not suddenly switched on during the braking operation. Instead, the electric vacuum pump may be switched on after the braking operation, when the driver releases the brake pedal and, therefore, no longer senses a change in the brake pedal pressure.

If the vacuum instantaneously prevailing in the vacuum reservoir is no longer expected to be sufficient for the entire braking operation, the switch-on threshold is not changed and the electric vacuum pump is activated automatically upon reaching the originally set switch-on threshold.

In order to be able to estimate whether the vacuum instantaneously prevailing in the vacuum reservoir minus the previously estimated decrease of the vacuum during the braking operation is greater than a predetermined adjustment point vacuum, i.e., whether braking to a required deceleration is possible without reaching the adjustment point of the braking system assisted by the brake booster, it is possible to ascertain a pressure difference in the brake booster between a target braking pressure and an instantaneous pre-braking pressure, and subsequently, based on this ascertained pressure difference and the vacuum instantaneously prevailing in the vacuum reservoir, to estimate the decrease of the vacuum in the vacuum reservoir during the braking operation. In other words, it is possible to estimate the expected vacuum consumption during the braking operation on the basis of the vacuum instantaneously prevailing in the vacuum reservoir and a pre-braking pressure difference to be generated in the braking system, and to compare it with the required vacuum for reaching a maximum target braking pressure before the adjustment point.

In this context, it is noted that the adjustment point of a brake force-boosted braking system is understood to mean the maximum point up to which a driver-initiated brake pedal force is transmitted to the brakes boosted by the brake booster. Above this brake pedal force, the brake booster can no longer act supportingly and a further increased brake pedal force is transmitted to the brakes unreinforced. In other words, the brake pedal force below the adjustment point is transmitted with a higher factor of proportionality to the brakes than it is above the adjustment point. In such case, the adjustment point is a function inter alia of the pressure difference and therefore of the vacuum available in the vacuum reservoir. Thus, the adjustment point vacuum is understood to mean the vacuum in the vacuum reservoir which is required to reach a certain pre-pressure in the adjustment point.

The decrease of the vacuum in the vacuum reservoir may be ascertained with the aid of a characteristic map which indicates a vacuum reduction as a function of the ascertained pressure difference between the target braking pressure and an instantaneous pre-braking pressure in the brake booster, as well as a function of the instantaneous pressure difference in the brake booster.

In other words, the characteristics specific to a particular brake booster system in terms of the decrease of the vacuum in the vacuum reservoir may be ascertained metrologically, for example, and stored in a characteristic map. During operation of the brake booster system, both an instantaneous pre-braking pressure in the brake booster and a maximum target braking pressure to be achieved may then be determined, and these data may then be compared with the data stored in the characteristic map, so that in this way it is possible to estimate the expected decrease of the vacuum in the vacuum reservoir during the instantaneous braking operation until the desired target braking pressure is achieved. In this case, a target braking pressure may be the braking pressure with which a sufficient deceleration of the motor vehicle is achieved.

Alternatively, the decrease of the vacuum in the vacuum reservoir may be ascertained as proportional to the pressure difference ascertained between the target braking pressure and the instantaneous pre-braking pressure. Put another way, the expected decrease of the vacuum to be estimated during the braking operation may be estimated using a vacuum-dependent factor which indicates a loss of vacuum per pressure difference.

The two previously described alternatives for estimating the decrease of the vacuum during the braking operation may be implemented with a high degree of accuracy, but require additional application effort.

As a further alternative, the decrease of the vacuum in the vacuum reservoir may be ascertained by extrapolation of a previously measured vacuum decrease. In so doing, the decrease of the vacuum in the vacuum reservoir required until the instantaneous pre-braking pressure is reached may be measured and, based on that, it may be extrapolated how the vacuum in the vacuum reservoir will be further reduced until the target braking pressure is reached. In the simplest case, a linear dependency of the vacuum in the vacuum reservoir on the braking pressure may be assumed for this extrapolation. However, more complicated and more precise dependencies may also be used as a basis. An estimation of the expected decrease of the vacuum in the vacuum reservoir by extrapolation may be implemented with little application effort.

If after estimating the expected decrease of the vacuum in the vacuum reservoir as a result of an instantaneous braking operation, the vacuum remaining in the vacuum reservoir after the braking operation proves to be greater than the adjustment point vacuum, i.e., greater than the vacuum required for boosted operation of the brake booster system, the switch-on threshold for the electric vacuum pump may then be temporarily reduced to a lower value. For example, the temporary reduction of the switch-on threshold may be maintained until the next implementation of the described control method, and then checked to see whether the switch-on threshold continues to remain reduced or is increased again to a predetermined standard value. The extent to which the switch-on threshold is reduced in this case may be predetermined.

Alternatively, the extent of the temporary reduction of the switch-on threshold may be selected depending on the estimated expected decrease of the vacuum in the vacuum reservoir as a result of an instantaneous braking operation, and depending on the instantaneous vacuum in the vacuum reservoir. In other words, instead of a "black and white" decision on whether the switch-on threshold is shifted or not, an incremental or continuous reduction of the switch-on threshold may also be implemented. For this purpose, various target braking pre-pressures may be defined.

In addition to the above-described method, a device for activating an electric vacuum pump for a brake booster of a vehicle is also described, which is designed to carry out the previously described method. Such a device may be provided in a motor vehicle in the form of a control unit or a regulating device. The device may include interfaces suitable for this, in order, for example, to be able to receive signals on the vacuum instantaneously prevailing in the vacuum reservoir. In addition, suitable data or characteristic maps may also be stored in the device in order, based on the signaled vacuum, to be able to estimate the expected decrease of the vacuum during the braking operation with the aid of a processing unit also to be provided. Furthermore, the device communicates with the electric vacuum pump in such a way that an instantaneously selected switch-on threshold below which the vacuum pump is intended to be activated may be predefined.

In addition, a computer program product and a computer readable medium on which such a computer program product is stored are also described, the computer program product including machine-readable code which, when executed on a suitable machine, activates the machine to carry out the above described method. The computer program product may be written in any arbitrary machineunderstandable language. The computer-readable medium may make use of different technical storage methods.

It is noted that possible features and advantages of specific embodiments of the present invention are described herein partly with reference to the method described for activating an electric vacuum pump for a brake booster and partly with reference to a corresponding device. Those skilled in the art will recognize that the different features may be arbitrarily combined with one another and may be translated from the method to the device and vice versa in order, in this way, to arrive at further specific embodiments and, as the case may be, to synergistic effects.

BRIEF DESCRIPTION OF THE DRAWINGS

FIG. 1 shows a braking system for a motor vehicle having a brake booster and an associated electric vacuum pump, as well as a device for activating the vacuum pump according to one specific embodiment of the present invention.

FIG. 2 shows a flow chart for illustrating a method according to one specific embodiment of the present invention.

Figure 3:
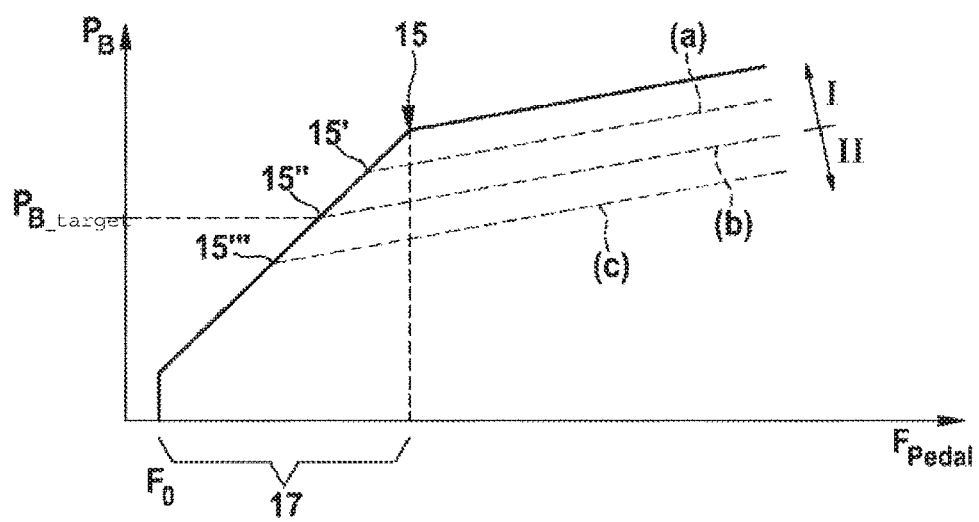
FIG. 3 shows a characteristic map of a braking system having a brake booster for illustrating the method according to one specific embodiment of the present invention.

The figures are purely schematic and not true to scale.

DETAILED DESCRIPTION

FIG. 1 shows parts of a braking system 1 for a motor vehicle. A brake pedal 7 activates a brake booster 3 which transmits a force applied by a driver to brake pedal 7 reinforced to the brakes of a vehicle (not shown). Brake booster 3 has a vacuum reservoir 9 in which a vacuum of up to 1000 hPa, for example, may be generated with the aid of an electric vacuum pump 5. With the aid of this vacuum from vacuum reservoir 9 it is possible to load a diaphragm provided in brake booster 3 and in this way boost the force applied by brake pedal 7.

A pressure sensor 13 measures the instantaneous vacuum inside vacuum reservoir 9. A control unit 11 is used to activate electric vacuum pump 5. For this purpose, control unit 11 receives the measurement data from pressure sensor 13 and, based on these data about the vacuum instantaneously prevailing in vacuum reservoir 9 and based on further information about the instantaneous braking operation and, in particular, on a maximum braking pressure to be generated by braking system 1, may decide whether or not electric vacuum pump 5 should be activated, or how a switch-on threshold for electric vacuum pump 5 should be instantaneously selected.

FIG. 2 shows a flow chart provided to illustrate how control unit 11 may influence a switch-on threshold for activating electric vacuum pump 5.

In a first step S1 a target braking pressure $P_{B\_target}$ and an instantaneously prevailing pre-braking pressure $P_{B\_instantaneous}$ are initially determined and a difference value $\Delta P_B$ of these two values is calculated.

In a second step S2 an expected decrease of the vacuum $\Delta P_V$ in the vacuum reservoir during the instantaneous braking operation is determined. This value $\Delta P_V$ is ascertained as a function $f(\Delta P_B, P_{V\_instantaneous})$ of the previously ascertained pressure difference $\Delta P_B$ between the target braking pressure and the instantaneous pre-braking pressure as well as the vacuum $P_{V\_instantaneous}$ instantaneously prevailing in the vacuum reservoir. The functional relation may be derived, for example, from a previously stored characteristic map, or ascertained as proportional to a pressure difference ascertained between the target braking pressure and the instantaneous pre-braking pressure. Alternatively, the vacuum decrease may be ascertained by extrapolation of a previously measured vacuum decrease.

In a subsequent third step S3 a vacuum level $P_{V\_target}$ is ascertained which is presumably set upon reaching the target braking pressure by subtracting the previously estimated vacuum decrease $\Delta P_V$ from the instantaneous vacuum $P_{V\_instantaneous}$.

In subsequent step S4 the target vacuum pressure $P_{V\_target}$ is compared with an adjustment point vacuum $P_A$.

In the event that the target vacuum $P_{V\_target}$ is greater than or equal to the adjustment point vacuum $P_A$, a switch-on threshold $P_{S\_temp}$ to be temporarily adjusted is set in a step S5 to a value which is smaller than a standard switch-on value $P_{S\_standard}$ by a difference value $\Delta P_S$. In other words, the switch-on threshold is temporarily reduced. In the process, the switch-on threshold indicates the pressure value below which the vacuum in the vacuum reservoir is meant to drop before the electric vacuum pump is to be activated.

In the event the target vacuum pressure $P_{V\_target}$ is smaller than the adjustment point vacuum $P_A$ a switch-on threshold $P_{S\_temp}$ to be temporarily adjusted remains unchanged or is set to the $P_{S\_standard}$ in a step S6.

The described method may be repeatedly carried out by a control unit 11. For example, the method may be carried out at intervals of 0.02 sec. so that the switch-on threshold may be adapted at appropriately short intervals to instantaneously prevailing requirements with respect to the vacuum to be generated by the vacuum pump.

The described method for activating an electric vacuum pump is further clarified with reference to FIG. 3. FIG. 3 displays a typical characteristic curve of a brake booster system. Here, the X-axis indicates the pedal force $F_{pedal}$. The braking pressure $P_B$ is indicated on the Y-axis.

Starting with a minimal pedal force $F_0$, braking pressure $P_B$, after an initial sharp rise, ascends linearly to an adjustment point 15 within a range 17. The slope of this rise indicates a measure for the boosting effect of the brake booster.

Above adjustment point 15 the brake booster is no longer able to contribute to an increase in the braking pressure, so that with a further increase in brake pedal force $F_{Pedal}$, the increase in braking pressure $P_B$ is less than in boosted range 17 up to adjustment point 15.

In terms of practical application, the braking system is aimed to always move within boosted range 17 of the characteristic curve, i.e., below adjustment point 15. However, the position of adjustment point 15 strongly depends on the vacuum prevailing within the vacuum reservoir. The greater this vacuum, the longer or up to higher braking pressures the brake booster is able to support the activation of a brake pedal. For example, dashed lines are drawn in FIG. 3 which represent from top to bottom a change in the characteristic curve of the brake booster with increasingly lowered vacuum in the vacuum reservoir. It is apparent, for example, that adjustment point 15''' for case (c), the lowest vacuum in the vacuum reservoir, is much lower than for case (a) with a substantially higher vacuum.

Area I indicates those cases in which the vacuum instantaneously prevailing in the vacuum reservoir minus the estimated vacuum decrease during the braking operation is great enough so that the minimum target braking pressure to be achieved remains below adjustment point 15. In such cases I, a switch-on threshold for the electric vacuum pump may be temporarily reduced so that the vacuum pump is not suddenly activated during the instantaneous braking operation and, therefore, to the driver, the feel of the brake pedal changes. It is continually ensured that a sufficient vacuum prevails in the vacuum reservoir, and that an assist from the brake booster lasts during the entire braking operation up to the target braking pressure, and the adjustment point is therefore not reached.

For cases II in which the vacuum instantaneously prevailing in the vacuum reservoir is not sufficient to compensate for the vacuum decrease occurring during the braking operation without dropping below the adjustment point vacuum, the switch-on threshold for the vacuum pump is not reduced.

Finally, it should be noted that the effectiveness of the described method may be enhanced with the use of a so-called overboost function in which an additional pressure buildup may be created by an ESP system (electronic stability program), in order to more or less virtually shift the adjustment point. As a result, the minimum deceleration or the desired target braking pressure may be reduced.

What is claimed is:

1. A method for activating an electric vacuum pump for a brake booster of a vehicle, the brake booster being supplied with a vacuum from a vacuum reservoir and the vacuum pump being adapted to increase the vacuum in the vacuum reservoir once the vacuum drops below a predefinable switch-on threshold, the method comprising:
   estimating an expected decrease of the vacuum in the vacuum reservoir as a result of an instantaneous braking operation; and
   temporarily reducing the switch-on threshold in the event a value for the vacuum instantaneously prevailing in the vacuum reservoir minus the estimated vacuum decrease is greater than a predetermined adjustment point vacuum, wherein the switch-on threshold is a threshold for switching on the vacuum pump.

2. The method as recited in claim 1, further comprising:
   ascertaining a pressure difference between a target braking pressure and an instantaneously prevailing pre-braking pressure in the brake booster; and
   estimating the decrease of the vacuum in the vacuum reservoir based on the ascertained pressure difference and the instantaneous vacuum in the vacuum reservoir.

3. The method as recited in claim 2, wherein the decrease of the vacuum in the vacuum reservoir is ascertained with the aid of a characteristic map indicating the vacuum decrease as a function of the ascertained pressure difference and the instantaneous pre-braking pressure in the brake booster.

4. The method as recited in claim 2, wherein the decrease of the vacuum in the vacuum reservoir is ascertained as proportional to the ascertained pressure difference.

5. The method as recited in claim 2, wherein the decrease of the vacuum in the vacuum reservoir is ascertained by extrapolation of a previously measured vacuum decrease.

6. The method as recited in claim 1, wherein an extent of the temporary reduction of the switch-on threshold is selected depending on the estimated expected decrease of the vacuum in the vacuum reservoir as the result of the instantaneous braking operation, and depending on the instantaneous vacuum in the vacuum reservoir.

7. The method as recited in claim 1, wherein the adjustment point vacuum is defined as a minimum vacuum in the vacuum reservoir, above which the vacuum in the vacuum reservoir is sufficient in order to assist a brake pedal activation with the aid of the brake booster.

8. The method as recited in claim 1, wherein the switch-on threshold is temporarily reduced for a duration of the instantaneous braking operation, and wherein the method further comprises one of the following:
   increasing, after the instantaneous braking operation as stopped, the switch-on threshold from a value to which it was reduced; and
   maintaining, after the instantaneous braking operation as stopped, the switch-on threshold at a value to which it was reduced.

9. The method as recited in claim 1, further comprising activating the electric vacuum pump after the instantaneous breaking operation has stopped.

10. A non-transitory computer-readable medium on which a computer program product is stored, the computer program product having machine-readable code, wherein the machine-readable code activates a machine for the purpose of carrying out a method for activating an electric vacuum pump for a brake booster of a vehicle, the brake booster being supplied with a vacuum from a vacuum reservoir and the vacuum pump being adapted to increase the vacuum in the vacuum reservoir once the vacuum drops below a predefinable switch-on threshold, the method comprising:
   estimating an expected decrease of the vacuum in the vacuum reservoir as a result of an instantaneous braking operation; and
   temporarily reducing the switch-on threshold in the event a value for the vacuum instantaneously prevailing in the vacuum reservoir minus the estimated vacuum decrease is greater than a predetermined adjustment point vacuum.

* * * * *